(12) United States Patent  (10) Patent No.: US 7,784,432 B1
Johnson  (45) Date of Patent: Aug. 31, 2010

(54) QUICK-RELEASE LASSO EYE

(76) Inventor: David Johnson, 2031 State Hwy. 59, La Grange, TX (US) 78945

( * ) Notice: Subject to any disclaimer, the term of this patent is extended or adjusted under 35 U.S.C. 154(b) by 349 days.

(21) Appl. No.: 12/151,628

(22) Filed: May 7, 2008

(51) Int. Cl.
  *A01K 15/04* (2006.01)
(52) U.S. Cl. .................... 119/805; 24/115 H; 43/44.91
(58) Field of Classification Search ......... 119/801–805; 43/44.91–44.92, 44.95; 24/115 H, 128, 129 R, 24/129 A, 129 D, 130
  See application file for complete search history.

(56) References Cited

U.S. PATENT DOCUMENTS

| | | | | |
|---|---|---|---|---|
| 281,704 A | * | 7/1883 | Ladd | 24/128 |
| 282,968 A | * | 8/1883 | Dyer | 24/132 R |
| 770,062 A | * | 9/1904 | Gartelman et al. | 24/130 |
| 860,189 A | * | 7/1907 | Chatfield | 24/115 H |
| 1,735,691 A | * | 11/1929 | Morgan | 24/18 |
| 2,151,664 A | * | 3/1939 | Redfield | 24/129 R |
| 2,506,274 A | * | 5/1950 | Maxwell et al. | 24/129 R |
| 3,165,091 A | * | 1/1965 | Welton | 119/805 |
| 4,928,634 A | | 5/1990 | Voigt | 119/805 |
| 5,806,469 A | | 9/1998 | Cooper-Ratcliff | 119/805 |

OTHER PUBLICATIONS

National Roper's Supply Catalog Fall 2006, p. 32 for various "Hondas" or quick release roping supplies.

* cited by examiner

*Primary Examiner*—Michael R Mansen
*Assistant Examiner*—Ebony Evans
(74) *Attorney, Agent, or Firm*—Derek R. Van Gilder (57) ABSTRACT

A quick-release lasso eye has a spring-memory eye line (1) with at least one eye-line flange (2, 13) positioned releasably in a flange receptacle (3, 15) of a quick-release channel (4) positioned opposite and parallel to a line-anchor aperture (5) in an eye base (6). The eye base is made of suitably hard, lightweight and strong material having a rope-attachment aperture (7) intermediate and parallel to the quick-release channel and the line-anchor aperture. The spring-memory eye line can be made of spring-resilient plastic or metal which can be covered with desired material (11, 21, 22) for functional, feel and aesthetic objectives optionally and selectively.

20 Claims, 5 Drawing Sheets

QUICK-RELEASE LASSO EYE

FIELD OF THE INVENTION

This invention relates to breakaway lasso-rope eyes and in particular a breakaway lasso-rope eye with a quick-release flange lock having an eye-line flange positioned releasably in a receptacle of a quick-release channel of an eye base.

BACKGROUND OF THE INVENTION

Lasso eyes are positioned on loop ends of lasso ropes. For roping practice and for some work-roping conditions, the lasso eyes are preferred to be breakaway releasable for release of a lassoed object and for restructure of the lasso eye for reuse of the lasso rope. There are known breakaway lasso eyes, but none with a quick-release lock of a lasso-rope eye line having at least one eye-line flange positioned quick-releasably in a quick-release channel receptacle of an eye base in a manner taught by this invention. Different but related prior art includes U.S. Pat. No. 4,928,634 granted to Voigt on May 29, 1990 and U.S. Pat. No. 5,806,469 granted to Cooper-Ratcliff, et al on Sep. 15, 1998.

SUMMARY OF THE INVENTION

Objects of patentable novelty and utility taught by this invention are to provide a quick-release lasso eye which:

allows quick-release breakaway and conveniently quick restructure of a lasso eye;

can have desired weight in proportion to weight of a rope lasso eye;

is sufficiently reliable, strong and long lasting for both practice and working lasso use;

can be covered with leather, rope and other material selectively for desired feel, functional and appearance characteristics;

has symmetric balance for accurate lassoing; and can be used conveniently by any foreseeable size of user hands and fingers.

This invention accomplishes these and other objectives with a quick-release lasso eye having a spring-memory eye line with at least one eye-line flange positioned releasably in a channel-end receptacle of a quick-release channel positioned opposite and parallel to a line-anchor aperture in an eye base. The eye base is made of suitably hard, lightweight and strong material having a rope-attachment aperture intermediate and parallel to the quick-release channel and the line-anchor aperture. The spring-memory eye line can be made of spring-resilient plastic or metal which can be covered with desired material for functional, feel and aesthetic objectives optionally and selectively.

BRIEF DESCRIPTION OF DRAWINGS

This invention is described by appended claims in relation to description of a preferred embodiment with reference to drawing FIGS. which are explained briefly as follows:

DESCRIPTION OF PREFERRED EMBODIMENT

This invention is described in relation to numbers which designate its features with the same numbers throughout a following patent description and patent claims.

Referring to FIGS. 1-4, a quick-release lasso eye has a spring-memory eye line (1) with a rope-end eye-line flange (2) positioned removably in a rope-end receptacle (3) of a quick-release channel (4) positioned opposite and parallel to a line-anchor aperture (5) in an eye base (6).

Preferably, the eye base (6) is made of suitably hard, lightweight and strong material such as a suitable plastic, having a rope-attachment aperture (7) intermediate and parallel to the quick-release channel (4) and the line-anchor aperture (5).

The spring-memory eye line (1) has a spring memory for positioning a release end (8) of the spring-memory eye line (1) in the quick-release channel (4) parallel to an anchor end (9) of the spring-memory eye line (1) with the rope-end eye-line flange (2) being positioned in the rope-end receptacle (3) of the quick-release channel (4) for arresting side travel of the release end (8) of the spring-memory eye line (1) out of the quick-release channel (4). An anchor end (9) of the spring-memory eye line (1) is anchored rigidly in the line-anchor aperture (5) for spring-positioning the release end (8) of the spring-memory eye line (1) in the quick-release channel (4) parallel to the anchor end (9) of the spring-memory eye line (1). A spring memory of the spring-memory eye line (1) is in spring-memory opposition to sideways and linear exit travel of the rope-end eye-line flange (2) in a direction opposite a lasso-eye loop (10) of the spring-memory eye line (1).

Pressure on the spring-memory eye line (1) from lassoing activity is nearly all linear in a direction away from the eye base (6). The same direction of pressure tends to keep the rope-end eye-line flange (2) pulled into the rope-end receptacle (3). There is relatively little if any sideways pressure on the release end (8) by the lassoing activity.

To quick-release breakaway a lasso tie of a lassoed object as may be desired, a user applies manual pressure against the release end (8) in a direction opposite from the spring-memory eye line (1) and opposite from spring-memory pressure of the spring-memory eye line (1) for removing the rope-end eye-line flange (2) from the rope-end receptacle (3). Then, sideways pressure on the release end (8) is applied manually by a user for breakaway quick release of the quick-release lasso eye by removing a lasso rope (12) from a lasso-eye loop (10).

Restructuring the quick-release lasso eye is accomplished by allowing memory spring pressure of the spring-memory eye line (1) to reposition the release end (8) laterally sideways in the quick-release channel (5) while manually applying pressure on the spring-memory eye line (1) in a direction of the release end (8) for causing the rope-end eye-line flange (2) to bypass a rope end of the eye base (6).

As illustrated in FIGS. 1-3, 6, 9 and 13, the spring-memory eye line (1) can include a plastic rod having an outside diameter of the anchor end (9) for fitting snugly within an inside periphery of the line-anchor aperture (5) and having an outside diameter of the release end (8) for fitting snugly intermediate inside walls of the quick-release channel (4).

Referring to FIGS. 5-9 and 12, the spring-memory eye line (1) can include a metallic rod with a smaller outside diameter than for the plastic rod and having an outside diameter of the anchor end (9) for fitting snugly within an appropriately smaller inside periphery of the line-anchor aperture (5) and having an outside diameter of the release end (8) for fitting snugly intermediate appropriately closer inside walls of the quick-release channel (4).

Figure 12:
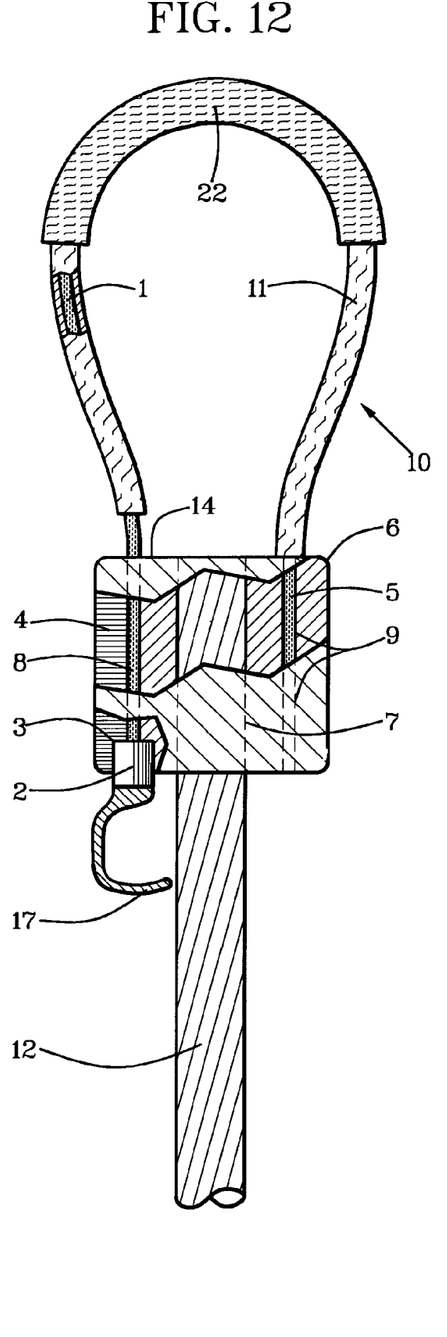
FIG. 12 is a cutaway elevation view of the quick-release lasso eye having raw-hide covering and other desired covering on a metallic spring-memory eye line and with the rope-end eye-line flange positioned removably in the rope-end receptacle of the quick-release channel.
Figure 13:
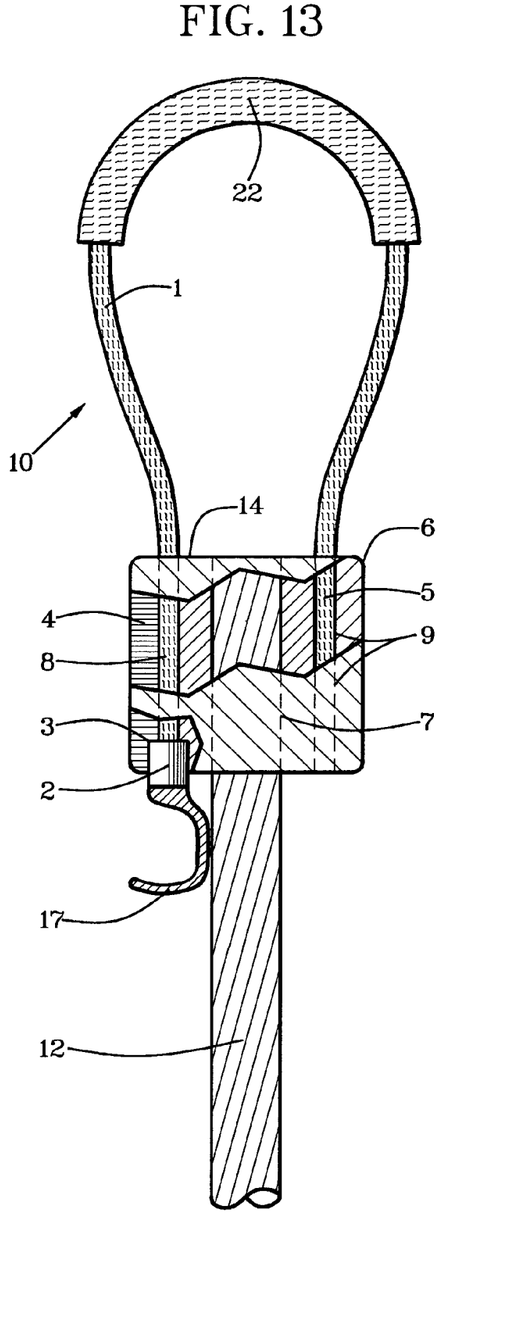
FIG. 13 is a cutaway elevation view of the quick-release lasso eye having the raw-hide covering on the plastic spring-memory eye line and with the rope-end eye-line flange positioned removably in the rope-end receptacle of the quick-release channel.

Referring to FIGS. 6 and 8-12, an eye-line covering (11) can be positioned on an outside periphery of the spring-memory eye line (1) designedly intermediate the quick-release channel (4) and the line-anchor aperture (5) for providing compatible sliding contact with a lasso rope (12) and for providing desirable handling characteristics and desirable aesthetics of the quick-release lasso eye selectively. The eye-line covering (11) can be made particularly desirable for softening animal or human contact with the spring-memory eye lines (1) that are metallic. The eye-line covering (11) is predeterminedly short for allowing linear travel of the release end (8). As shown in FIGS. 12-13, the eye-line covering (11) can include raw hide (22).

Figures 1, 2, 4:
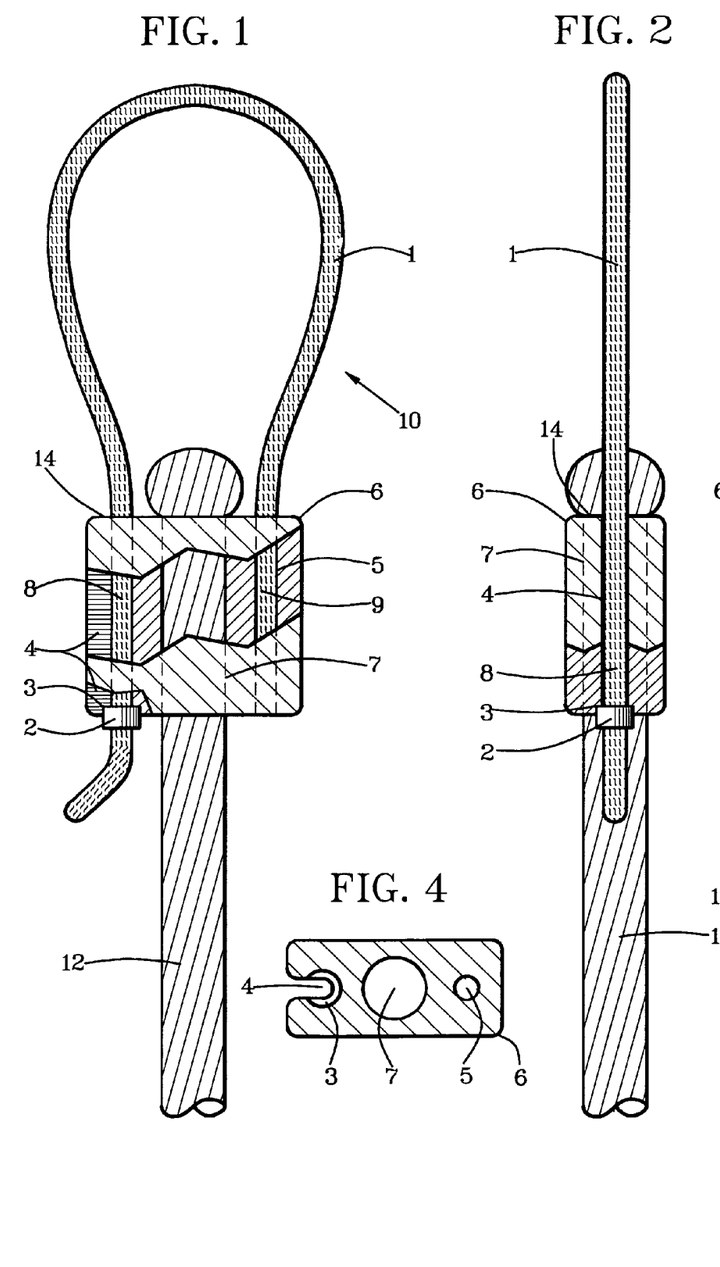
FIG. 1 is a cutaway elevation view of the quick-release lasso eye having a plastic spring-memory eye line and an eye-line flange in a rope-end receptacle of a quick-release channel.
FIG. 2 is a cutaway view of a release side of the FIG. 1 illustration.
FIG. 4 is a bottom view of a FIG. 1 eye base.
Figure 3:
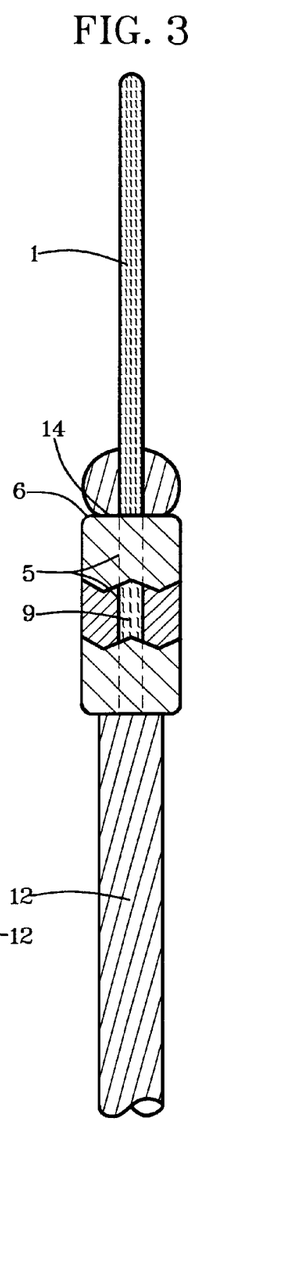
FIG. 3 is an cutaway view of an anchor side of the FIG. 1 illustration.
Figure 5:
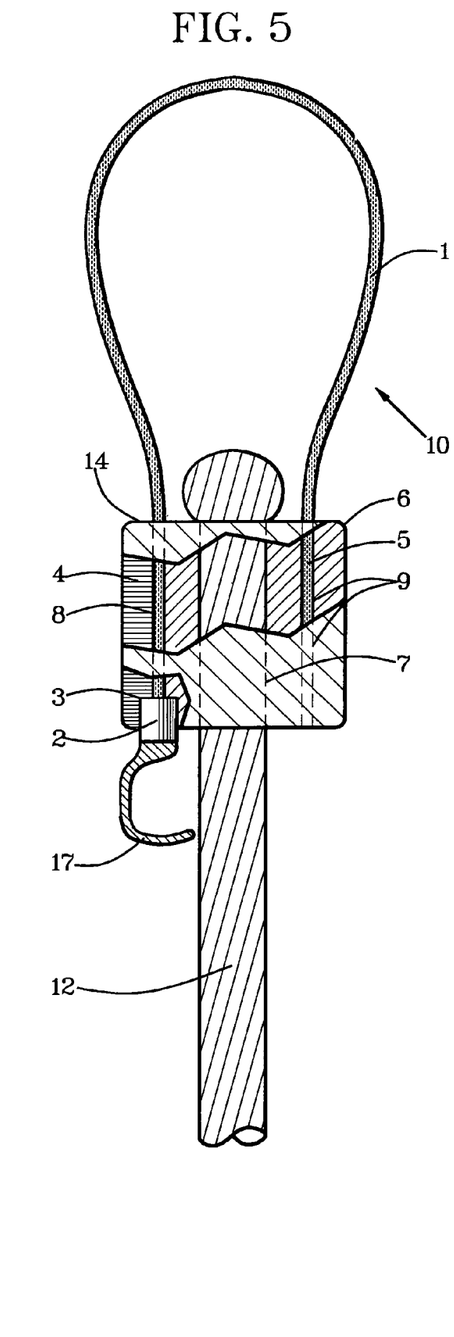
FIG. 5 is a cutaway elevation view of the quick-release lasso eye having a metallic spring-memory eye line and a rope-end eye-line flange in the rope-end receptacle of the quick-release channel.
Figure 6:
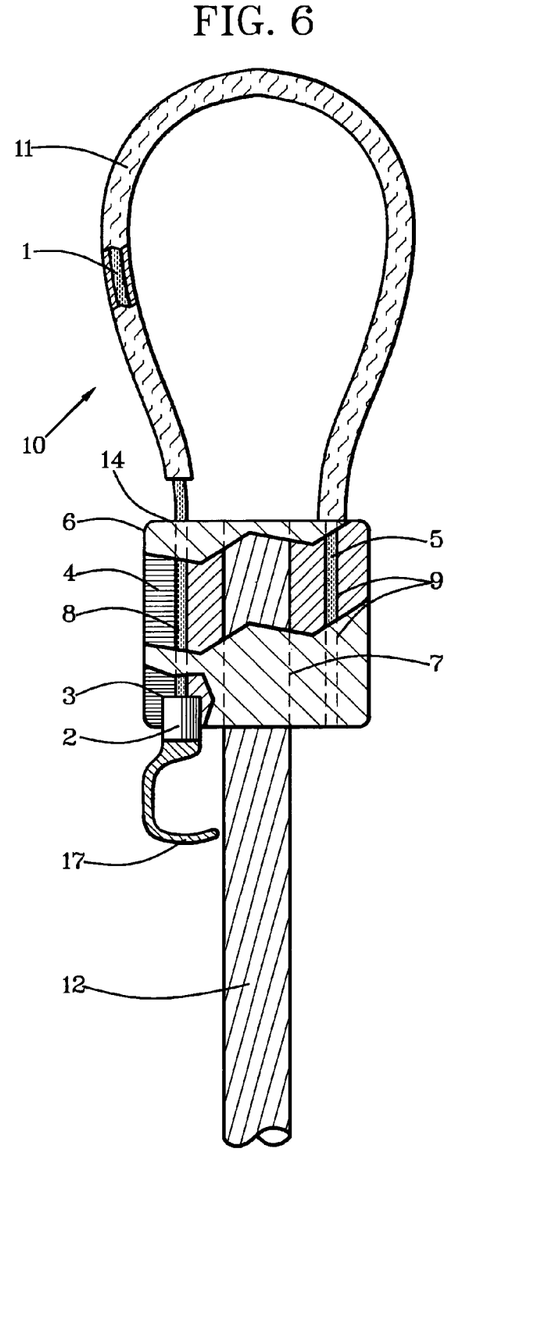
FIG. 6 is a cutaway elevation view of the quick-release lasso eye having a functional covering on the metallic spring-memory eye line, the rope-end eye-line flange in the rope-end receptacle of the quick-release channel, a rope attached without a rope bulge, and a quick-release handle.
Figures 7, 8, 9:
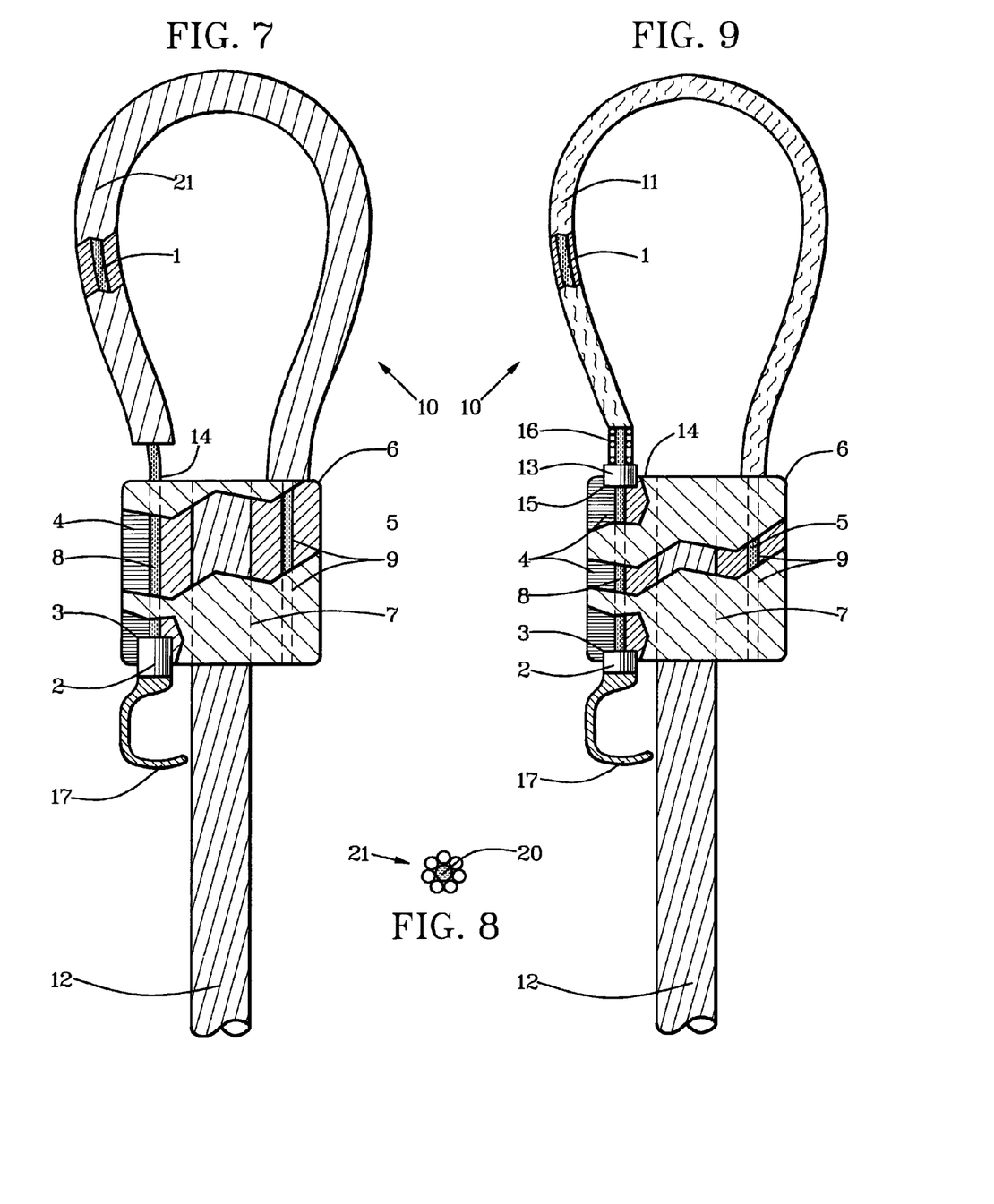
FIG. 7 is a cutaway elevation view of the quick-release lasso eye having the metallic spring-memory eye line with a pliable-rope covering.
FIG. 8 is an end view of the metallic spring-memory eye line with the pliable-rope covering.
FIG. 9 is a cutaway elevation view of the quick-release lasso eye having the rope-end eye-line flange in convergent combination with a loop-end eye-line flange for retaining the metallic spring-memory eye line in the quick-release channel.

Referring to FIGS. 7-8, the spring-memory eye line (1) can include a solid center (20) of pliable rope (21). The solid center (20) has the anchor end (9) for fitting snugly within the inside periphery of the line-anchor aperture (5) and the release end (8) has an outside diameter of the release end (8) for fitting snugly intermediate the inside walls of the quick-release channel (4).

Figures 10, 11:
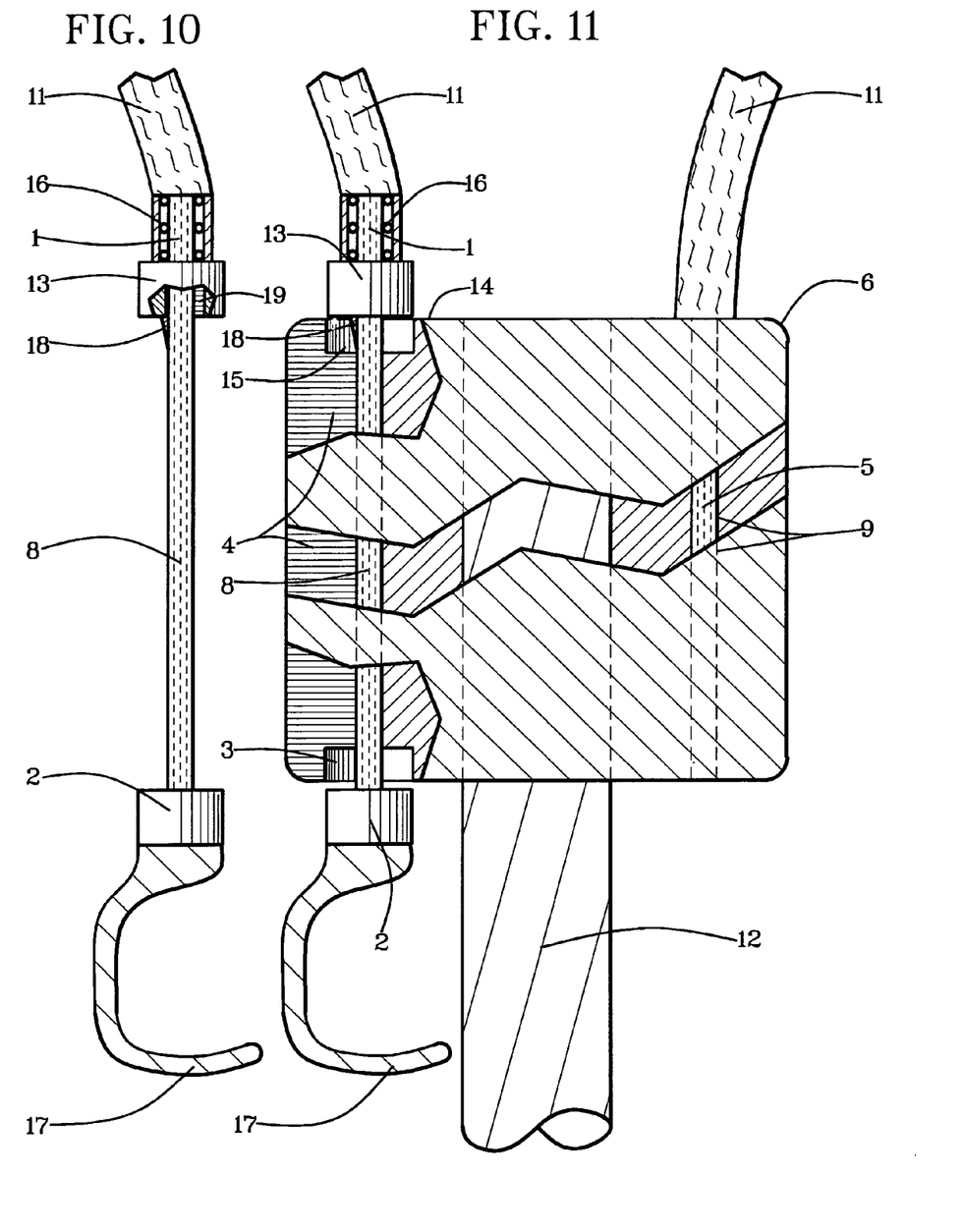
FIG. 10 is an exploded fragmentary view of the release end of the spring-memory eye line removed from the quick-release channel having the rope-end eye-line flange.
FIG. 11 is an exploded fragmentary view of an eye-base portion with the release end of the spring-memory eye line positioned in the quick-release channel.

Referring to FIGS. 9-11, the quick-release lasso eye can have a loop-end eye-line flange (13) positioned slidably and rotatably on the release end (8) of the spring-memory eye line (1) proximate a loop end (14) of the quick-release channel (4). The loop-end eye-line flange (13) is positioned removably in a loop-end receptacle (15) in the loop-end (14) of the quick-release channel (4).

The loop-end eye-line flange (13) is spring-pressured in a direction of the loop-end receptacle (15) by a flange-spring member (16) on the spring-memory eye line (1). The flange-spring member (16) can include a coil spring, a rubber-like spring, a coil spring covered by rubber-like material as illustrated or other known spring members.

The release end (8) of the spring-memory eye line (1) is retained in the quick-release channel (4) by positioning of the rope-end eye-line flange (2) in the rope-end receptacle (3) in combination with positioning of the loop-end eye-line flange (13) in the loop-end receptacle (15) with convergent-directional spring pressure of the flange-spring member (16) and the spring-memory eye line (1). The release end (8) of the spring-memory eye line (1) is releasable for sideways exit from the quick-release channel (4) by disengagement of the rope-end eye-line flange (2) from the rope-end receptacle (3) with movement of the spring-memory eye line (1) in a direction of the eye base (6) while the loop-end eye-line flange (13) is disengaged from the loop-end receptacle (15) and while simultaneously the loop-end eye-line flange (13) is maintained at a predeterminedly unlocked distance of separation from the loop-end receptacle (15). This allows sideways travel of the release end (8) from the quick-release channel (4).

Referring to FIGS. 10-11, a spring protrusion (18) can be positioned on the spring-memory eye line (1) for engagement with the loop-end eye-line flange (13) for releasably retaining the loop-end eye-line flange (13) a predetermined separation distance from the rope-end eye-line flange (2) for moving the release end (8) sideways from the quick-release channel (4). A release channel (19) is positioned linearly in an inside periphery of the loop-end eye-line flange (13) for receiving the spring protrusion (18). The loop-end eye-line flange (13) is rotatable on the outside periphery of the spring-memory eye line (1) for positioning the release channel (19) to receive the spring protrusion (18) for repositioning the release end (8) in the quick-release channel (4) to reset the spring-memory eye line (1).

An embodiment of the invention with the rope-end eye-line flange (2) and the loop-end eye-line flange (13) in convergent relationship is intended more for working ranch use for which maximum reliability may be desired in contrast to use for roping practice. The rope-end receptacle (3) and the loop-end receptacle (15) are at least one side-travel restriction in at least one end of the quick-release channel (4) for additionally arresting the side travel of the release end (8) of the spring-memory eye line (1) out of the quick-release channel (4).

As depicted in FIGS. 5-7 and 12-13, the rope-end receptacle (3) can be predeterminedly deep and the rope-end eye-line flange (2) can be predeterminedly long for maximizing reliability of resistance to sideways exit of the release end (8) from the quick-release channel (4) with only the rope-end eye-line flange (2).

Referring to FIGS. 9-11, 5-7, and 9-13, a quick-release handle (17) can be positioned on the release end (8) of the spring-memory eye line (1) proximate the rope-end eye-line flange (2) for grasping, pulling and lifting the release end (8) of the spring-memory eye line (1) selectively to a breakaway mode and for restructuring the quick-release lasso eye. The quick-release handle (17) can be shaped trigger-like and rotated to a desired rotational orientation.

Quick-release breakaway of the lasso-eye loop (10) can be accomplished by mere trigger-pull action of the quick-release handle (17). Resetting the lasso-eye loop (10) can be accomplished by again trigger-pulling the quick-release handle (17). A mere rotational flick of the flange-spring member (16) while again pulling the trigger-like quick-release handle (17) is all that is required for resetting the lasso eye having double-flange locking of the lasso-eye loop (10).

Referring to FIGS. 1, 2-9 and 11, a lasso rope (12) can be positioned and affixed in the rope-attachment aperture (7) and the anchor end (9) can be positioned in the line-anchor aperture (5) and affixed with suitable adhesive, a bulge, a knot, and a set screw or other fastener selection.

A new and useful quick-release lasso eye having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A quick-release lasso eye comprising:

a spring-memory eye line (1) with an rope-end eye-line flange (2) positioned removably in a rope-end receptacle (3) of a quick-release channel (4) positioned opposite and parallel to a line-anchor aperture (5) in an eye base (6);

the eye base (6) being made of suitably hard, lightweight and strong material having a rope-attachment aperture (7) intermediate and parallel to the quick-release channel (4) and the line-anchor aperture (5);

the spring-memory eye line (1) having a spring memory for positioning a release end (8) of the spring-memory eye line (1) in the quick-release channel (4) parallel to an anchor end (9) of the spring-memory eye line (1) with the rope-end eye-line flange (2) being positioned in the rope-end receptacle (3) of the quick-release channel (4) for arresting side travel of the release end (8) of the spring-memory eye line (1) out of the quick-release channel (4);

an anchor end (9) of the spring-memory eye line (1) being anchored rigidly in the line-anchor aperture (5) for spring-positioning the release end (8) of the spring-memory eye line (1) in the quick-release channel (4) parallel to the anchor end (9) of the spring-memory eye line (1); and a spring memory of the spring-memory eye line (1) being in spring-memory opposition to exit travel of the rope-end eye-line flange (2) out of the quick-release channel (4) laterally and linearly.

2. The quick-release lasso eye of claim 1 in which:

the spring-memory eye line (1) is a plastic rod having an outside diameter of the anchor end (9) for fitting snugly within an inside periphery of the line-anchor aperture (5) and having an outside diameter of the release end (8) for fitting snugly intermediate inside walls of the quick-release channel (4).

3. The quick-release lasso eye of claim 1 in which:

the spring-memory eye line (1) is a metallic rod having an outside diameter of the anchor end (9) for fitting snugly within an inside periphery of the line-anchor aperture (5) and having an outside diameter of the release end (8) for fitting snugly intermediate inside walls of the quick-release channel (4).

4. The quick-release lasso eye of claim 1 in which:

an eye-line covering (11) is positioned on an outside periphery of the spring-memory eye line (1) designedly intermediate the quick-release channel (4) and the line-anchor aperture (5) for providing compatible sliding contact with a lasso rope (12) and for providing desirable handling characteristics and desirable aesthetics of the quick-release lasso eye selectively.

5. The quick-release lasso eye of claim 1 in which:

the spring-memory eye line (1) is a solid center (20) of pliable rope (21);

the solid center (20) has the anchor end (9) for fitting snugly within the inside periphery of the line-anchor aperture (5) and the release end (8) has an outside diameter of the release end (8) for fitting snugly intermediate the inside walls of the quick-release channel (4).

6. The quick-release lasso eye of claim 1 in which:

a loop-end eye-line flange (13) is positioned in slidable and rotatable contact with release end (8) of the spring-memory eye line (1) proximate a loop end (14) of the quick-release channel (4);

the loop-end eye-line flange (13) is positioned removably in a loop-end receptacle (15) in the loop-end (14) of the quick-release channel (4);

the loop-end eye-line flange (13) is spring-pressured in a direction of the loop-end receptacle (15) by a flange-spring member (16) on the spring-memory eye line (1);

the release end (8) of the spring-memory eye line (1) is retained in the quick-release channel (4) by positioning of the rope-end eye-line flange (2) in the rope-end receptacle (3) in convergent combination with positioning of the loop-end eye-line flange (13) in the loop-end receptacle (15); and the release end (8) of the spring-memory eye line (1) is releasable for laterally sideways exit from the quick-release channel (4) by disengagement of the rope-end eye-line flange (2) from the rope-end receptacle (3) with movement of the spring-memory eye line (1) in a direction of the eye base (6) while the loop-end eye-line flange (13) is disengaged from the loop-end receptacle (15) and the loop-end eye-line flange (13) is maintained at an unlocked distance of separation from the loop-end receptacle (15) for allowing laterally sideways travel of the release end (8) from the quick-release channel (4).

7. The quick-release lasso eye of claim 6 in which:

a spring protrusion (18) is positioned on the spring-memory eye line (1) for engagement with the loop-end eye-line flange (13) for releasably retaining the loop-end eye-line flange (13) at the unlocked-separation distance from the rope-end eye-line flange (2) for moving the release end (8) sideways from the quick-release channel (4);

a release channel (19) is positioned linearly in an inside periphery of the loop-end eye-line flange (13) for receiving the spring protrusion (18);

the loop-end eye-line flange (13) is rotatable on the outside periphery of the spring-memory eye line (1) for positioning the release channel (19) to receive the spring protrusion (18) for repositioning the release end (8) in the quick-release channel (4) for resetting the spring-memory eye line (1).

8. The quick-release lasso eye of claim 1 in which:

a quick-release handle (17) is positioned on the release end (8) of the spring-memory eye line (1) proximate the rope-end eye-line flange (2) for grasping, pulling and lifting the release end (8) of the spring-memory eye line (1) selectively to a breakaway mode.

9. A quick-release lasso eye comprising:

a spring-memory eye line (1) with a rope-end eye-line flange (2) positioned removably in a rope-end receptacle (3) of a quick-release channel (4) positioned opposite and parallel to a line-anchor aperture (5) in an eye base (6);

a loop-end eye-line flange (13) positioned in sliding contact with the spring-memory eye line (1) proximate a loop end (14) of the quick-release channel (4);

the loop-end eye-line flange (13) is positioned removably in a loop-end receptacle (15) in the loop-end (14) of the quick-release channel (4);

the loop-end eye-line flange (13) is spring-pressured in a direction of the loop-end receptacle (15) by a flange-spring member (16) on the spring-memory eye line (1);

the spring-memory eye line (1) has a release end (8) positioned removably in the quick-release channel (4) and prevented from exit laterally sideways out of the quick-release channel (4) by positioning of the rope-end eye-line flange (2) in the rope-end receptacle (3) with spring pressure of the spring-memory eye line (1) in combination with positioning of the loop-end eye-line flange (13) in the loop-end receptacle (15) with spring pressure of the loop-spring member (16);

the release end (8) of the spring-memory eye line (1) is releasable for laterally sideways exit from the quick-release channel (4) by movement of the spring-memory eye line (1) in a direction of the eye base (6) while travel of the loop-end eye-line flange (13) in a direction towards the loop-end receptacle (15) is prevented for separating the rope-end eye-line flange (2) and the loop-end eye-line flange (13) a predetermined separation distance apart for moving the release end (8) out laterally sideways from the quick-release channel (4);

the eye base (6) being made of suitably hard, lightweight and strong material;

a rope-attachment aperture (7) intermediate and parallel to the quick-release channel (4) and the line-anchor aperture (5);

the spring-memory eye line (1) having a spring memory for positioning the release end (8) of the spring-memory eye line (1) in the quick-release channel (4) parallel to an anchor end (9) of the spring-memory eye line (1) with the rope-end eye-line flange (2) being positioned in the rope-end receptacle (3) of the quick-release channel (4) for arresting side travel of the release end (8) of the spring-memory eye line (1) out of the quick-release channel (4);

the anchor end (9) of the spring-memory eye line (1) being anchored rigidly in the line-anchor aperture (5) for supporting spring-positioning of the release end (8) of the spring-memory eye line (1) in the quick-release channel (4);

the spring memory of the spring-memory eye line (1) being in spring-memory opposition to exit travel of the rope-end eye-line flange (2) in a direction opposite a lasso-eye loop (10) of the spring-memory eye line (1);

a quick-release handle (17) is positioned on the spring-memory eye line (1) proximate the rope-end eye-line flange (2) for grasping, pulling and lifting the release end (8) of the spring-memory eye line (1) selectively to a breakaway mode and for repositioning the release end (8) in the quick-release channel (4) selectively;

a spring protrusion (18) is positioned on the spring-memory eye line (1) for engagement with the loop-side eye-line flange (13);

a release channel (19) is positioned in the inside periphery of the loop-side eye-line flange (13); and the loop-end eye-line flange (13) is predeterminedly rotatable on the spring-memory eye line (1) for receiving the spring protrusion (18) and repositioning the loop-end eye-line flange (13) within the loop-end receptacle (15).

10. The quick-release lasso eye of claim 9 in which:

the spring-memory eye line (1) is a plastic rod having an outside diameter of the anchor end (9) for fitting snugly within an inside periphery of the line-anchor aperture (5) and having an outside diameter of the release end (8) for fitting snugly intermediate inside walls of the quick-release channel (4).

11. The quick-release lasso eye of claim 9 in which:

the spring-memory eye line (1) is a metallic rod having an outside diameter of the anchor end (9) for fitting snugly within the inside periphery of the line-anchor aperture (5) and having an outside diameter of the release end (8) for fitting snugly intermediate inside walls of the quick-release channel (4).

12. The quick-release lasso eye of claim 9 in which:

an eye-line covering (11) is positioned on an outside periphery of the spring-memory eye line (1) designedly intermediate the quick-release channel (4) and the line-anchor aperture (5) for providing compatible sliding contact with a lasso rope (12), desirable handling characteristics and desirable aesthetics selectively.

13. The quick-release lasso eye of claim 9 in which:

the spring-memory eye line (1) is a solid center (20) of pliable rope (21);

the solid center (20) has the anchor end (9) for fitting snugly within the inside periphery of the line-anchor aperture (5) and the release end (8) has an outside diameter of the release end (8) for fitting snugly intermediate the inside walls of the quick-release channel (4).

14. A quick-release lasso eye comprising:

a spring-memory eye line (1) having a release end (8) positioned releasably in a quick-release channel (4) on a release side of an eye base (6);

an anchor end (9) of the spring-memory eye line (1) positioned rigidly in a line-anchor aperture (5) on an anchor side of the eye base (6);

a rope-attachment aperture (7) intermediate and parallel to the quick-release channel (4) and the line-anchor aperture (5) in the eye base (6);

the spring-memory eye line (1) having a spring memory for positioning the release end (8) of the spring-memory eye line (1) in the quick-release channel (4) for arresting side travel of the release end (8) of the spring-memory eye line (1) out of the quick-release channel (4); and at least one side-travel restriction in at least one end of the quick-release channel (4) for arresting the side travel of the release end (8) of the spring-memory eye line (1) out of the quick-release channel (4).

15. The quick-release lasso eye of claim 14 in which:

the spring-memory eye line (1) is a plastic rod having an outside diameter of the anchor end (9) for fitting snugly within an inside periphery of the line-anchor aperture (5) and having an outside diameter of the release end (8) for fitting snugly intermediate inside walls of the quick-release channel (4).

16. The quick-release lasso eye of claim 14 in which:

the spring-memory eye line (1) is a metallic rod having an outside diameter of the anchor end (9) for fitting snugly within an inside periphery of the line-anchor aperture (5) and having an outside diameter of the anchor end (9) for fitting snugly intermediate inside walls of the quick-release channel (4).

17. The quick-release lasso eye of claim 14 in which:

at least one eye-line covering (11) is positioned on an outside periphery of the spring-memory eye line (1) designedly intermediate the quick-release channel (4) and the line-anchor aperture (5) for providing compatible sliding contact with a lasso rope (12), desirable handling characteristics and desirable aesthetics selectively.

18. The quick-release lasso eye of claim 14 in which:

the spring-memory eye line (1) is a solid center (20) of pliable rope (21);

the solid center (20) has the anchor end (9) for fitting snugly within the inside periphery of the line-anchor aperture (5) and the release end (8) has an outside diameter of the release end (8) for fitting snugly intermediate the inside walls of the quick-release channel (4).

19. The quick-release lasso eye of claim 14 in which:

the side-travel restriction includes a rope-end eye-line flange (2) positioned removably in a rope-end receptacle (3) proximate a rope end of the quick-release channel (4).

20. The quick-release lasso eye of claim 14 in which:

the side-travel restriction includes a loop-end eye-line flange (13) positioned removably in a loop-end receptacle (15) proximate a loop end (14) of the quick-release channel (4).

\* \* \* \* \*